United States Patent
Rarey et al.

[11] 3,765,654
[45] Oct. 16, 1973

[54] SYSTEM FOR MEASURING AND CONTROLLING MIXTURE CONTENT

[75] Inventors: Kenneth W. Rarey, South Holland; John B. Kennedy, Jr., Oak Forest, both of Ill.

[73] Assignee: Continental Can Company, Inc., New York, N.Y.

[22] Filed: Aug. 6, 1971

[21] Appl. No.: 169,622

Related U.S. Application Data

[62] Division of Ser. No. 768,377, Oct. 17, 1968, Pat. No. 3,610,205.

[52] U.S. Cl. ................................. 259/4, 118/637
[51] Int. Cl. .............................................. B01f 15/04
[58] Field of Search ............... 259/1, 4; 118/637, 118/9; 117/17.5

[56] References Cited
UNITED STATES PATENTS
| | | | |
|---|---|---|---|
| 3,233,781 | 2/1966 | Grubbs | 118/637 |
| 3,399,652 | 9/1968 | Gawron | 117/17.5 |
| 3,430,606 | 3/1969 | Pease | 117/17.5 |

Primary Examiner—Robert W. Jenkins
Attorney—Diller, Brown, Ramik & Holt

[57] ABSTRACT

A method of detecting the ratio of component particles in a mixture wherein the quantity of one of the component particles is continually decreased, as in an electrostatic printing operation, includes the provision of a window adjacent the path of movement of the mix of component particles and contacting particles in transit therepast, illumination of the mix through the window and detection of light reflected from the mix through the window. Replenishment of the depleted component may be electrically controlled in accordance with the light reflected and optical filter provisions may be employed to limit the spectrum of the light with which the mix is illuminated where the components of the mix differ in color. Diversion of a quantity of mix to by-pass an area wherein depletion of one component occurs effects mixing in the direction of flow and cross-flow mixing effects greater consistency in the mix transverse to the direction of flow.

4 Claims, 6 Drawing Figures

Patented Oct. 16, 1973

INVENTORS
KENNETH W. RAREY &
JOHN B. KENNEDY, Jr.

ATTORNEYS

Patented Oct. 16, 1973
3,765,654
2 Sheets-Sheet 2
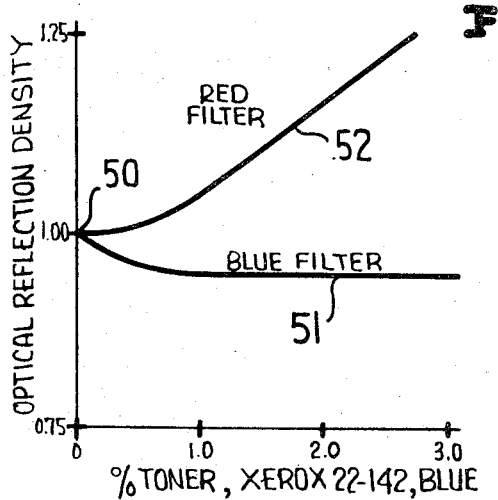
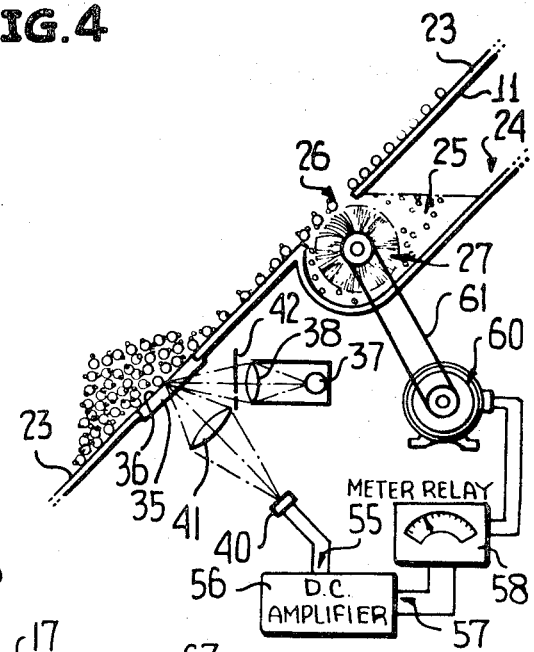
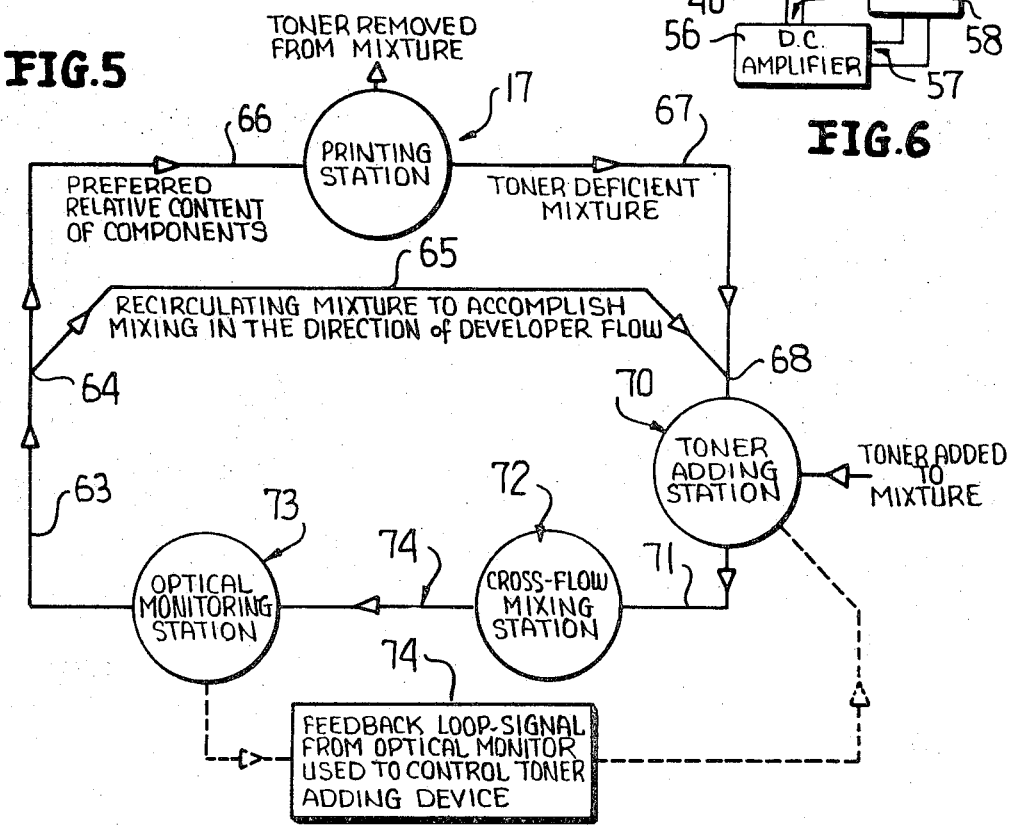
INVENTORS
KENNETH W. RAREY &
JOHN B. KENNEDY, Jr.
ATTORNEYS

SYSTEM FOR MEASURING AND CONTROLLING MIXTURE CONTENT

This is a division of U.S. Pat. application Ser. No. 768,377, filed on Oct. 17, 1968 and now U.S. Pat. No. 3,610,205.

This invention relates generally to an apparatus for measuring and controlling the ratio of components in a mixture of two or more components and more particularly to an apparatus for optically detecting and electrically controlling the retio of toner to carrier particles in an electrostatic printing operation.

Previously optical monitoring of mixtures to indicate the ratio of component particles therein has been employed. However, previously known methods and apparatus have been marked by several disadvantages including the tendency of the employed optical monitoring system to exhibit a reduction in sensitivity on prolonged use resultant from the dusting or collection of particles on surfaces of theoptical system. Similarly, previously known optical monitoring systems have failed to provide for differences in color between the component particles of a mixture to provide an indication of the ratio of those component particles based upon such differences in color. Further, previously known optical mixture monitoring systems and control provisions have failed to provide either methods or apparatus for correcting the ratio of component particles in a moving mix while providing a complete mixing of those particles both in the direction of flow and transverse thereto.

In view of the foregoing, it is an object of this invention to provide an apparatus for optically monitoring the ratio of component particles in a mixture of such particles without a reduction in sensitivity through the build-up of particles upon portions of the optical system.

In accordance with the immediately foregoing object, it is a further object of this invention to provide an optical monitoring system including a window adjacent the path of movement of the mix and having a surface over which particles of the mix slide in automatic cleaning action, and light source and photo-sensitive provisions for illuminating the mix in transit past the window and for detecting light reflected from the mix.

A further object of this invention is to provide an apparatus for indicating the ratio of component particles in a mix through the employment of optical monitoring provisions including a light source for illuminating a portion of the mix, photo-sensitive means for receiving the light reflected from the mix and an optical filter for limiting the spectrum of light projected against the mix, causing the degree of reflected light to depend largely upon the ratio of component particles of differing color.

Still another object of this invention is to provide an apparatus for increasing the consistency of a mixture of two or more component particles which are moved to and away from an area wherein the quantity of one of the component particles is decreased and including the diversion of a quantity of the particles to by-pass the aforesaid area, providing mixing of the component particles in the direction of flow of the mix and providing mixiing of the component particles transverse to the direction of flow of such particles to provide a consistency of mix across the flow thereof.

Still another object of this invention is to provide in an electrostatic printing or coating apparatus provisions for optically nonitoring a carrier mix of carrier and toner particles, means responsive to the optical monitoring of the mix for providing an electrical signal indicative of the ratio of component particles in the mix and means for replenishing toner in the developer mix upon occurrence of an electrical signal of a predetermined magnitude.

With these and the further objects in view that will hereinafter appear, the nature of the invention will be more clearly understood with reference to the several figures of the accompanying drawings, the following description and the appended claims.

IN THE DRAWINGS

FIG. 4 is a graphical representation plotting optical density of a portion of developer mix including blue toner particles against variations in the percentage toner particles in the developer mix and shows the variations in optical density resultant from the alternate employment of a red filter and a blue filter in the illumination of the developer mix.

FIG. 5 is a diagrammatic illustration of the operation of the electrostatic printing apparatus according to FIG. 1 and illustrates the movement of developer mix in such apparatus, including the diversion or recirculation of a portion of the mix and the cross-flow mixing following toner addition.

FIG. 6 is an enlarged diagrammatic view of the optical system of FIG. 1 and illustrates the employment of a photo-sensitive sensor and meter relay combination for indicating the ratio of component portions of the mix and for controling toner addition.

Figure 1:
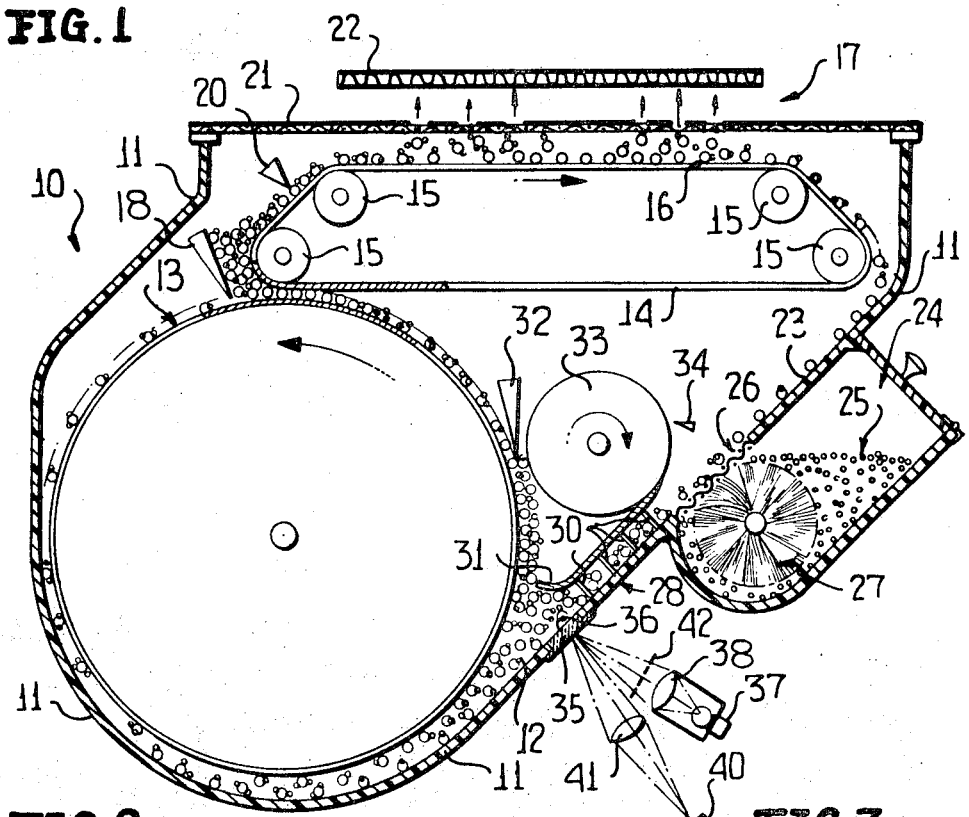
FIG. 1 is a diagrammatic view of electrostatic printing apparatus, and shows the optical provisions for monitoring the employed developer mix, a first mix transporting drum, a second mix diverting drum and cross-flow mixing provisions.

Referring to the drawings in detail, FIG. 1 illustrates an electrostatic printing device, generally referred to by the numeral 10, of a type suitable for use in the practice of this invention and similar to the electrostatic printing device shown and described in the U.S. Pat. to K.W. Rarey and J. B. Kennedy, Jr., No. 3,306,193. The electrostatic printing device or printing machine 10 includes a suitable housing 11, shaped to define a developer mix depository 12. The mix depository 12 is positioned to receive a quantity of developer particles and toner particles which may be commercially available or of a type suitably selected for employment in the electrostatic printing or coating process.

Disposed adjacent the depository 12 of the printing machine 10 is a rotatable magnetic feeding drum 13 which, upon rotaion, transports a quantity of the developer mix upwardly into adhering relation with an elongate conductive belt electrode 14. The conductive belt 14 is entrained for movement about a plurality of belt support pulleys 15 and an upper run 16 of the endless conductive belt 14 conveys a predetermined quantity of mix into the printing zone, generally referred to by the numeral 17, of the over-all printing apparatus 10. A first doctor blade 18 is arranged adjacent the exterior of the cylinder 13, providing a back-up of developer mix adjacent the belt electrode 14 and a second doctor blade 20 is arranged in proximity to the belt electrode 14, providing an even distribution of developer mix upon the upper run 16 of the belt electrode 14 within the printing zone 17. The establishment of an appropriate field or fields in the printing zone 17 draws the particles of developer upwardly into contact with a screen stencil 21 and a portion of the toner particles of the developer mix are removed from the carrier particles for the production of an image or coating upon a substrate 22, as determined by the configuration of the masking of the screen stencil 21. It will, of course, be evident that the ratio of carrier particles to toner particles is altered within the printing zone 17 and the developer mix is conveyed via the conductive belt electrode 14 away from the printing zone 17 for return to the depository 12.

The quantity of toner particles in the developer mix is replenished during movement of the developer mix from the printing zone 17 to the depository 12 via a surface 23 provided upon an interior portion of the housing 11. A toner reservoir 24 provides a source for replenishing of toner in the developer mix from a supply 25 of toner housed therein. A screened window 26 communicates through the surface 23 between the interior of the housing 11 and the reservoir 24 and a rotatable brush 27 effects passage of toner particles through the screened window 26 and developer particles en route from the printing zone 17 to the depository 12 pass across the screened window 26. The screen mesh of the window 26 is sufficiently fine to prevent passage of carrier particles therethrough while permitting rotation of the brush 27 to effect replenishment of the toner in the developer mix recently employed in the printing operation.

The replenished developer mix continues past the screened window 26, along the interior surface 23 of the housing 11 and into the depository 12. Cross-flow mixing provisions generally indicated by the numeral 28 are provided immediately following the screened window 26 along the path of movement of the developer mix and include a plurality of pins 30 mounted between the surface 23 and a guide plate 31 lying parallel to and above the surface 23. The pins 30 intersect the path of flow of the developer, providing obstacles with which the developer particles collide to cause those particles to move at least partially transverse to the general direction of flow of the developer during its passage through the cross-flow mixing provisions 28. Accordingly, mixing of the developer in the direction transverse to the flow of the developer mix is effected, providing greater homogeneity of the mix in the direction transverse to the general flow thereof.

A blade 32 mounted adjacent the outer periphery of the magnetic drum 13 intersects movement of a portion of the developer particles carried upon the periphery of the drum 13 and a further magnetic drum 33 having its periphery adjacent the blade 32 and on the opposite side thereof from the first mentioned magnetic drum 13 carries the portion of developer mix intersected by the blade 32 away from the main magnetic drum 13 and an additional doctor blade 34 removes the diverted developer mix from the surface of the drum 33, returning that portion of the mix into the general flow of developer from the printing zone 17. The blade 32 and magnetic drum 33 effect mixing of the developer in the direction of flow of the developer by diversion of quantity of the mix and reapplication of that quantity into the mix flowing along the surface 23 of the housing 11.

A window 35 communicates between the interior and exterior of the housing 11 adjacent the flow path of developer within the over-all printing apparatus 10 and is placed along that path of flow immediately following the cross-mixing provisions 28. The window 35 defines an interior surface 36, co-planar with the interior surface 23 of the housing 11 and providing a surface over which developer mix flows during its passage past the window 35. Attention may be given to the location of the window 35 to assure that the developer contacting the interior surface 36 is in motion and in sliding contact with the surface 36 to provide automatic cleansing of the interior surface, substantially reducing the "dusting" effect resultant from the build-up of toner deposit upon the interior surface such as reduces the transparency provided by the window 35 during operation of the printing apparatus 10.

A light source 37 which may include an associated lens or lens system 38 is positioned to project a light beam through the window 35 and against the developer mix in transit therepast. A photo-sensitive detector or sensor 40 is positioned to receive light reflected through the window 35 from the mix in transit therepast and a further lens or lens system 41 may be provided for focusing the reflected light upon the photo-sensitive detector 40. A colored optical filter 42 is shown intersecting the light with which the developer mix is illuminated to limit the spectrum thereof and to provide greater sensitivity of the photo-sensitive detector 40 to variations in the ratio of toner to carrier, as will be discussed more fully hereinafter.

In an electrostatic printing operation such as that provided by the over-all printing apparatus generally referred to by the numeral 10, it is common to employ toner particles of finely divided, pigmented or dyed resin, these particles having an average "diameter" in the range 10 to 15 microns. The carrier particles employed in the developer mix commonly are from 6 to 8 times larger in diameter than the aforementioned toner particles. It has been found that best printing results when the percentage by weight of toner particles in the over-all developer mix is in the range from about 2 percent through 4 percent. Within this range, variations in the percentage of toner have relatively little effect on the quality of the produced image or coating.

Where production rate printing or coating is to be effected, as for example, in the case where a large number of serially conveyed articles are to have toner applied thereto, a number of printing operations may be effected without the addition of toner, provided the percentage of toner in the developer mix remains within the range indicated hereinabove. Thorough mixing of the carrier and toner, as by the cross-flow mixing arrangement 28 discussed hereinabove and by the diversion and reapplication of developer mix discussed hereinabove with respect to the magnetic drum 33, allows a fuller employment of the developer mix within a printing apparatus prior to the addition of toner. However, where printing or coating is to be effected at production rates, it is desirable to automatically supply additional toner, maintaining the percentage toner within the preferred 2 percent thorugh 4 percent range, without attention to the number of printing operations effected by the printing apparatus. Further, it should be noted that where a solid coating is to be applied to a substrate, the number of successful printing operations possible between additions of toner is substantially reduced.

Where the toner and carrier particles consituting the developer mix are of differing optical qualities, that is, differing in reflective qualities or color, the optical density of the developer will be dependent upon the precentage toner or ratio of toner particles to carrier particles within the developer mix. Reflection of light from a portion of the developer mix is dependent upon the optical density of the mix and as the optical density increases through the increase of particles of greater light absorbent characteristic, the reflection of light from the portion of developer decreases.

Figure 2:
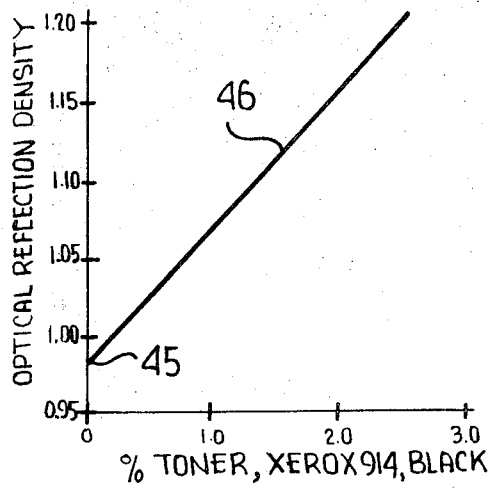
FIG. 2 is a graphical illustration plotting the variation in optical density of a quantity of developer mix against variations in the percentage toner particles in the mix.

FIG. 2 represents the variation of optical density with variation of percentage of toner in a developer mix employing nickel carrier particles, medium grey in appearance, and "Xerox 914" black toner. Employing a Macbeth RD-100 Densitometer, the optical density indicated for the carrier particles along was slightly less than 1.00 as indicated at point 45 in FIG. 2. As the precentage toner within the carrier mix was increased, a substantially linear increase in optical density was indicated as illustrated by the line 46 in FIG. 2. The relatively substantial change in optical density indicated by FIG. 2 where black toner particles are employed provides sufficient alteration in the light reflected from a portion of the mix to allow monitoring of the ratio of constituent mix components.

It will be apparent that where the constituent mix component exhibit one or more colors other than white, black and intermediate grey shades, variations in the reflection of "white" light from the developer mix will be sustantially reduced for variations in precentage toner. Optical filteration of the light applied to the mix, however, may be employed to limit the spectrum of the light from the illuminating light source to cause reflection from the developer mix to again vary substantially with variations in the ratio of consituent mix components. Illumination of the mix with a colored light beam of a color which is either substantially reflected or substantially absorbed by one of the colored mix components causes the reflective characteristic of the mix to approximate the reflective characteristics of a system wherein the mix varies in shades between black and white.

Figure 3:
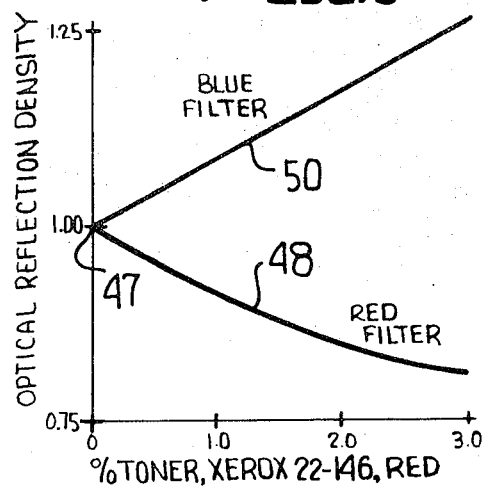
FIG. 3 is a graphical illustration plotting variations in the optical density of a quantity of developer mix employing red toner particles against variations in the percentage toner particles in the mix and illustrates the variations in optical density resultant from the alternate employment of a blue and a red filter in illuminating the developer mix.

Illustrated in FIG. 3 is the optical density of developer mix employing "Xerox 22-146" red toner particles and the aforementioned medium grey nickel carrier particles, plotted against variations in the percentage of toner particles within the mix. The illustrated measurements were again made with a "Macbeth RD-100 Densitometer" and illumination of the mix via a red filter indicated an optical density of approximately 1.00 in the absence of toner as indicated at point 47 in FIG. 3. An increase in the percentage of red toner particles within the mix resulted in a greater reflection of light therefrom and a resultant decrease in the indicated optical density as illustrated by the line 48 of FIG. 3. Similarly, the employment of a blue filter resulted in a greater absorbing of the light as the percentage of red toner was increased as indicated by the line 50 in FIG. 3.

In FIG. 4 there is illustrated variations in optical density with variations in the percentage of blue toner of the type designated "Xerox 22-142" in a mix employing the aforementioned medium grey nickel carrier particles. The aforementioned densitometer was employed to indicate the optical densities illustrated in FIG. 4 and a blue filter, limiting the spectrum of the light illuminating the mix to a portion of the blue range, resulted in a slight decrease in the indicated optical density with increases in the percentage of blue toner, as illustrated by the line 51 of FIG. 4, and resultant from a greater reflection of the blue light with increases in the "blueness" of the developer mix. However, the blue filter employed did not provide truly significant variations in the indicated optical density, thus illustrating that a blue filter of slightly differing color characteristic would be preferable if the reflected light was to be employed to indicate the ratio component particles in the mix. However, the employment of a red filter provided a substantial variation in indicated optical density from 1.00, representing a complete deficiency of blue toner as indicated at point 50 in FIG. 4 and a substantial increase in optical density with increases in the percentage of employed blue toner as indicated by the line 52 in FIG. 4.

FIG. 6 illustrates the employment of an optical monitoring system as illustrated in FIG. 1 with suitably selected control provisions for controlling the addition of toner to maintain the toner within the predetermined optimum percentage range. Again, the window 35 is provided having a surface 36 coplanar with the interior surface 23 of the housing 11. In view of the fact that the developer mix moves directly across the surface 36 of the window 35 in contact therewith, fabrication of the window 35 from sapphire or other abrasion resistant material is preferable. The light source 37, illuminating the mix through the window 35 may be chosen from suitable or commercially available illuminators such as the "1087 Microscope Illuminator" available from the American Optical Company. Preferably the photosensitive detector or sensor 40 constitutes a photovoltaic cell, again suitably selected or commercially available, such as the "82M Selenium Photovoltaic Cell" available from the International Rectifier Corp. The cll 40 provides a small D.C. output signal representative of the light reflected thereto from the mix adjacent the window 35 and the output signal from the cell 40 is applied to the input 55 of a suitably selected or commercially available D.C. amplifier 56. The amplified D.C. signal is taken from an output 57 of the amplifier 56 and applied to a meter relay 58. The meter relay 58 may be of a known or commercially available type such as the "Model 503L" 0-1 ma meter and "Model 901A" relay control module combination available from Assembly Products, Incorporated and includes meter provisions for indicating the magnitude of the D.C. current applied thereto. The meter relay 58 provides an output signal therefrom as by the closure of relay contacts indluded therein upon the occurrence of an input of predetermined magnitude, thus controlling operation of a suitably selected motor 60 connected in driving relation, as at 61, with the brush 27 of the toner replenishing provisions of the over-all printing apparatus 10. As the percentage of toner within the developer mix drops to a predetermined percentage within the optimum precentage range, the motor 60 is energized effecting replenishment of toner into the developer mix via the screened window 26.

FIG. 5 diagrammatically illustrates the over-all operation of the printing apparatus of FIG. 1, employing the mix montiroing and control provisions of FIG. 6. Developer mix is moved along a predetermined path 63 and at point 64 a poriton of the mix moving along the path 63 is diverted along a recirculation path 65, while a remaining portion of the mix is directed, via a path 66 to the printing station or zone 17 for application in a printing or coating process. Toner deficient mix is taken from the printing zone 17 along a path 67 and rejoined with the diverted or recirculated portion of mix at the point 68. The diverted or recirculated portion of mix, then, has by-passed the printing zone 17 via the path 65 and the percentage toner so diverted has not been altered. The combined toner deficient mix quantity and diverted quantity passes a toner adding station 70 which may include the reservoir, brush and screened window combination illustrated in FIG. 1. Replenishment of toner occurs at the toner adding station 70 and the replenished developer mix is passed along a path 71 to a cross-flow mixing station 72 such as the cross-flow mixing provisions 28 illustrated in FIG. 1. The now-substantially homogeneous mix is passed to an optical monitoring station 73 via a path 74 and at the station 73 which may include the monitoring provisions discussed hereinabove, the mix is optically monitored and control provisions 74, connected in feedback relation to the toner adding provisions 70 control the addition of toner when the necessity of such an addition is detected at the monitoring station 73. It will be noted from FIG. 5 that the homogeneity of the employed developer mix is greatly increased by the provision of cross-flow mixing intermediate the toner adding station 70 and the optical monitoring station 73 and by the recirculation of a diverted portion of the mix of preferred toner/carrier proportions. This provides consistency in the printing operation occurring at the printing zone 17 and assures correct operation of the optical monitoring provisions by assuring monitoring of a substantially homogeneous portion of developer at the station 73.

While preferred methods and apparatus have been indicated herein, variations from the described preferred embodiments within the spirit and scope of this invention will be apparent to those skilled in the art.

We claim:

1. A mixture monitoring system for detecting the ratio of components in a moving mix of two or more components of different optical qualities, a window located along a path of movement of the mix and having surface means disposed at an acute angle to the horizontal for supporting the mix for sliding movement therealong in cleansing relation to the window, a light source for illuminating the mix in transit past said window, photo-sensitive detector means for detecting the light reflected from said mix, and means connected with said photo-sensitive detector means for producing an electrical signal representative of the ratio of components of said mix.

2. A mixture monitoring system according to claim 1 including means for limiting the spectrum of light to increase variations in reflection from said mix resultant from variations in the ratio of components therein.

3. A mixture monitoring system for detecting the ratio of components in a moving mix of two or more components of differing optical qualities, a window located along a path of movement of the mix and having surface means for supporting the mix for sliding movement therealong in cleansing relation to the window, a light source for illuminating the mix in transit past said window, photo-sensitive detector means for detecting the light reflected from said mix, and means connected with said photo-sensitive detector means for producing an electrical signal representative of the ratio of components of said mix, further comprising means for diverting a portion of the mix and for combining the diverted portion with mix in transit to said window, and cross-flow mixing means for providing mixing transverse to the direction of movement of the mix.

4. A mixture monitoring system according to claim 3 further comprising means for controlling the ratio of components in said mix including means located adjacent the path of movement of said mix for supplying to said mix an additional portion of one of said components, and means responsive to said electrical signal for controlling said means for supplying.

* * * * *